US008831082B2

(12) United States Patent
Kumar (10) Patent No.: US 8,831,082 B2
(45) Date of Patent: Sep. 9, 2014

(54) SYSTEMS AND METHODS FOR BLIND MODE ADAPTIVE EQUALIZATION WITH MULTIPLE ALGORITHMS

(71) Applicant: Rajendra Kumar, Cerritos, CA (US)

(72) Inventor: Rajendra Kumar, Cerritos, CA (US)

(73) Assignee: Rajendra Kumar, Cerritos, CA (US)

( * ) Notice: Subject to any disclaimer, the term of this patent is extended or adjusted under 35 U.S.C. 154(b) by 0 days.

(21) Appl. No.: 13/762,048

(22) Filed: Feb. 7, 2013

(65) Prior Publication Data
US 2014/0219327 A1    Aug. 7, 2014

(51) Int. Cl.
*H03H 7/30*    (2006.01)
*H04L 27/01*    (2006.01)

(52) U.S. Cl.
CPC ...................................... *H04L 27/01* (2013.01)
USPC ............................. 375/232; 375/230; 375/229

(58) Field of Classification Search
USPC ......................................... 375/232, 230, 229
See application file for complete search history.

(56) References Cited

U.S. PATENT DOCUMENTS

| | | | |
|---|---|---|---|
| 5,918,161 A | 6/1999 | Kumar et al. | |
| 7,450,924 B1 | 11/2008 | Mostafa et al. | |
| 2005/0281327 A1* | 12/2005 | Liao et al. | 375/232 |
| 2008/0260017 A1 | 10/2008 | Tsuie et al. | |
| 2011/0103454 A1* | 5/2011 | Bose et al. | 375/232 |

OTHER PUBLICATIONS

Sammuel Jalali, Wireless Channel Equalization in Digital Communication Systems, 2012, 166 pages, Claremont, California and Long Beach, California.

Yoichi Sato, A Method of Self-Recovering Equalization for Multi-level Amplitude-Modulation Systems, IEEE Transactions and Communications, Jun. 1975, pp. 679-682, Kawasaki, Japan.

Hanks H. Zeng et al., Blind Equalization Using the Constant Modulus Algorithm, 1996, pp. 400-403, Connecticut.

Shafat Abrar et al., Soft Constraint Satisfaction Multimodulus Blind Equalization Algorithms, IEEE, 2004, pp. 853-856, Dhahran, Saudi Arabia.

Dominique N. Godard, Self-Recovering Equalization and Carrier Tracking in Two-Dimensional Data Communication Systems, IEEE Transactions on Communications, Nov. 1980, pp. 1867-1875, vol. COM-28, No. 11, La Gaude, France.

R. Kumar et al., State Inverse and Decorrelated State Stochastic Approximation, Automatica, 1980, pp. 295-311, vol. 16, Great Britain.

Rajendra Kumar et al., Detection Techniques in Least Squares Identification, Automatica, 1981, pp. 805-819, vol. 17, No. 6, Great Britain.

Rajendra Kumar, Convergence of a Decision-Directed Adaptive Equalizer, 1983, pp. 1319-1324, Long Beach, California.

Rajendra Kumar et al., Super Fast and Efficient Channel Equalizer Architecture Based on Neural Network, IEEE, 2012, pp. 1-11, Long Beach, California.

(Continued)

*Primary Examiner* — Zewdu Kassa
(74) *Attorney, Agent, or Firm* — Fulwider Patton LLP (57) ABSTRACT

Various embodiments described herein are directed to methods and systems for blind mode adaptive equalizer system to recover complex valued data symbols from the signal transmitted over time-varying dispersive diversity wireless channels. For example, various embodiments may utilize an architecture comprised of a bank of estimation units, a normalizing gain estimator, a DSP unit and a feedback shift register providing the equalizer feedback state vector. The estimation unit may be further comprised of a multiplicity of adaptive algorithms providing various filtered estimates of the data symbol to the DSP unit or providing the joint estimate of the transmitted data symbol.

22 Claims, 7 Drawing Sheets

(56) References Cited

OTHER PUBLICATIONS

Rajendra Kumar et al., Adaptive Equalization Via Fast Quantized-State Methods, IEEE Transactions on Communications, Oct. 1981, pp. 1492-1501, vol. COM-29, No. 10.

Russell H. Lambert et al., Forward/Inverse Blind Equalization, IEEE, 1995, pp. 1463-1467, Los Angeles, California.

R. R. Lopes et al., Blind Iterative Channel Identification and Equalization, IEEE, 2001, pp. 2256-2260, Atlanta Georgia.

Wonzoo Chung et al., The Local Minima of Fractionally-Spaced CMA Blind Equalizer Cost Function in the Presence of Channel Noise, IEEE, 1998, pp. 3345-3348.

* cited by examiner

SYSTEMS AND METHODS FOR BLIND MODE ADAPTIVE EQUALIZATION WITH MULTIPLE ALGORITHMS

BACKGROUND

Broadband wireless systems are currently in a rapid evolutionary phase in terms of development of various technologies, development of various applications, deployment of various services and generation of many important standards in the field. The increasing demand on various services justifies the need for the transmission of data on various communication channels at the highest possible data rates. The multipath and fading characteristics of the wireless channels result in various distortions, the most important of those being the intersymbol interference (ISI) especially at relatively high data rates. Adaptive equalizers are employed to mitigate the ISI introduced by the time varying dispersive channels and possibly arising from other sources. In one class of adaptive equalizers, a training sequence known to the receiver is transmitted that is used by adaptive equalizer for adjusting the equalizer parameter vector to a value that results in a relatively small residual ISI. After the training sequence, the data is transmitted during which period the equalizer continues to adapt to slow channel variations using decision directed method.

Among the various algorithms to adapt the equalizer parameter vector are the recursive least squares (RLS) algorithm, exponentially weighted Kalman filter, LMS algorithm, and the quantized state (QS) algorithm, the last one taught by Kumar et. al. in, "Adaptive Equalization Via Fast Quantized-State Methods", IEEE Transactions on Communications, Vol. COM-29, No. 10, October 1981. Kumar at. al. teach orthogonalization process to arrive at fast and computationally efficient identification algorithms in," State Inverse and Decor-related State Stochastic Approximation", Automatica, Vol. 16, May 1980. The training approach, however, is not desirable in many communication applications such as those involving video conference type of applications that will require a training sequence every time a different speaker talks. Moreover, the need for training sequence results in a significant reduction in capacity as for example, in GSM standard, a very significant part of each frame is used for the equalizer training sequence. Also, if during the decision-directed mode the equalizer deviates significantly due to burst of noise or interference, all the subsequent data will be erroneously received by the receiver until the loss of equalization is detected and the training sequence is retransmitted and so on.

There are many other applications where the equalizers are applied as in antenna beam forming, adaptive antenna focusing of the antenna, radio astronomy, navigation, etc. For example, Kumar et. al. teach in Method and Apparatus for Reducing Multipath Signal Error Using Deconvolution, U.S. Pat. No. 5,918,161, June 1999, an equalizer approach for a very different problem of precise elimination of the multipath error in the range measurement in GPS receiver. In all of various applications of equalizers and due to various considerations such as the logistics and efficiency of systems, it has been of great interest to have the equalizer adapt without the need for a training sequence. Such equalizers are the termed the blind mode equalizers.

Among some of the approaches to blind mode equalization is the Sato's algorithm that is similar to the LMS algorithm except that it does not have any training period. Kumar in, "Convergence of A Decision-Directed Adaptive Equalizer," Proceedings of the 22$^{nd}$ IEEE Conference on Decision and Control, 1983, Vol. 22, teaches a technique wherein an intentional noise with relatively high variance is injected into the decision-directed adaptive algorithm with the noise variance reduced as the convergence progressed and shows that the domain of convergence of the blind mode equalizer was considerably increased with the increase in the noise variance at the start of the algorithm. The technique taught by Kumar is analogous to the annealing in the steel process industry and in fact the term simulated annealing was coined after the introduction by Kumar. Lambert et. al., teach the estimation of the channel impulse response from the detected data in, "Forward/Inverse Blind Equalization," 1995 Conference Record of the 28$^{th}$ Asilomar Conference on Signals, Systems and Computers, Vol. 2, 1995.

Another blind mode equalization method applicable to the case where the modulated data symbols have a constant envelope and known as Goddard or constant modulus algorithm (CMA) is based on minimization of the magnitude square of the estimate of the estimate of the data symbol and a constant that may be selected to be 1. An example of references for the CMA is W. Chung, et. al., "The local minima of fractionally-spaced CMA blind equalizer cost function in the presence of channel noise," Proc. IEEE International Conference on Acoustics, Speech, and Signal Processing, pp. 3345-8, 12-15 May, 1998.

Some of the prior blind mode equalizers have relatively long convergence period and are not universally applicable in terms of the channels to be equalized and in some cases methods such as the one based on polyspectra analysis are computationally very expensive. The CMA method is limited to only constant envelope modulation schemes such as M-phase shift keying (MPSK) and thus are not applicable to modulation schemes such as M-quadrature amplitude modulation (MQAM) and M-amplitude shift keying (MASK) modulation that are extensively used in wireless communication systems due to their desirable characteristics. Tsuie et. al. in, Selective Slicing Equalizer, Pub. No. US 2008/0260017 A1, Oct. 23, 2008, taught a selective slicing equalizer wherein in a decision feedback equalizer configuration, the input to the feedback path may be selected either from the combiner output or the output of the slicer depending upon the combiner output. Kumar in, Systems and Methods for Adaptive Blind Mode Equalization, U.S. patent application Ser. No. 13/434,498, Mar. 29, 2012, teaches blind mode equalizer with hierarchical architecture.

The prior blind mode equalization techniques are for the case of a single channel that may be the result of combining the signals received over multiple diversity channels before equalization. Such an approach does not take advantage of the differences that may exist among the diversity channels. Some of the algorithms have relatively slow convergence rate and may be limited in terms of their applicability to various modulation formats. It is desirable to have blind mode adaptive equalizers that are efficient for the case of the signal received over dispersive diversity channels, possess robustness and some level of inherent redundancy to avoid convergence to any local minima, have wide applicability without, for example, restriction of constant modulus signals, are relatively fast in convergence, are computationally efficient, have modular configuration to provide a tradeoff between complexity and performance. The equalizers of this invention possess these and various other benefits.

SUMMARY OF THE INVENTION

Various embodiments described herein are directed to methods and systems for blind mode multiple algorithms adaptive equalizer system (BMMAES) to recover the in general complex valued data symbols from the signal transmitted over time-varying dispersive wireless channels. For example, various embodiments may utilize an architecture comprised of a normalizing gain estimator, an estimation unit for providing a multiplicity N filtered estimates of the data symbols, and a DSP unit for providing a jointly detected data symbol based on the multiplicity N filtered estimates. In the decision feedback configuration, the architecture is further comprised of a feedback shift register for providing a feedback state vector, comprised of the delayed versions of the jointly detected data symbol, to the estimation unit for eliminating the inter symbol interference (ISI) due to the past symbols.

In the feed forward mode of the equalizer architecture, the estimation unit is further comprised of a feed forward shift register for providing a feed forward state vector to a first multiplicity N inner product operators providing the N feed forward signals, on the basis of the respective equalizer forward weight vectors, for generating the N error signals for updating the multiplicity N adaptive algorithms that provide the N equalizer forward weight vectors.

In the decision feedback mode of the equalizer architecture, the estimation unit is further comprised of a second multiplicity N inner product operators providing the N feedback signals on the basis of the respective equalizer feedback weight vectors, for modifying the N error signals for updating the multiplicity N adaptive algorithms that provide the N equalizer weight vectors comprised of the respective feed forward and feedback weight vectors.

The normalizing gain estimator is further comprised of a bank of N parameter $\alpha$ estimators wherein the $i^{th}$ parameter $\square$ estimator provides the estimate of the parameter $\alpha_i$ for normalizing the filtered estimate, on the basis of the $i^{th}$ filtered estimate $s_i$ of the data symbol and the equalizer forward weight vector from the $i^{th}$ adaptive algorithm for i=1, 2, ..., N. The parameter $\alpha$ estimator is further comprised of an estimator of the power in the filtered estimate, and an estimator of the power in the noise component of the filtered estimate, for obtaining the estimate of the power of the signal component of the filtered estimate.

The DSP unit is further comprised of a bank of phase alignment subsystem units for providing gain normalization and phase alignment of the N filtered signals, a reference phase generator for generating the reference phase, a means of further adjusting the phase of the filtered signals, a combiner weights generator, a weighted combiner for weighted combining of the phase adjusted signals, and a decision device for providing the jointly detected data symbol.

The $i^{th}$ phase alignment subsystem unit for i=1, 2, ..., N, is further comprised of a gain normalizer for normalizing the power in the signal component of the filtered estimate to the signal power in the data symbols, a phase accumulator unit for providing the phase alignment of the $i^{th}$ filtered estimate, a decision device for providing the $i^{th}$ detected data symbol based on the $i^{th}$ filtered estimate, a phase threshold device for providing the detected phase $\phi_i$, and a means for estimating the signal to residual inter symbol interference (ISI) plus noise power ratio $\Gamma_i$ for the $i^{th}$ filtered estimate.

The phase threshold device determines the sector in the signal constellation diagram of the data symbol in which the phase aligned filtered estimate lies, wherein the sector in the signal constellation diagram may be one of the sectors of rotational symmetry in the constellation diagram. For example, the data symbol may be a MQAM modulated signal with the order of modulation $M=N^2$ for some integer N, and has four sectors of rotational symmetry. In various other embodiments of the invention, the sectors may correspond to the four quadrants of the constellation diagram for any signal constellation diagram.

Various embodiments of the blind mode multiple algorithms equalizer system (BMMAES) to recover the in general complex valued data symbols from the signal transmitted over dispersive diversity wireless channels with order of diversity $N_c$ may utilize an architecture comprised of a normalizing gain estimator, a bank of $N_c$ estimation units wherein the estimation unit is for receiving the signal over one of the $N_c$ diversity channels and providing $N_a$ filtered estimates on the basis of $N_a$ adaptive algorithms, a a collator for collating the filtered estimates of the data symbols from the bank of $N_c$ estimation units providing the collated N filtered estimates of the data symbols provided by the $N_c$ estimation units, and a DSP unit for providing the jointly detected data symbol based on the collated N filtered estimates of the data symbols. In the feedback configuration, the architecture is further comprised of a feedback shift register for providing a feedback state vector, comprised of the delayed versions of the jointly detected data symbol, to the $N_c$ estimation units for eliminating the inter symbol interference (ISI) due to the past symbols.

The various adaptive algorithms in the $N_c$ estimation units may all be distinct and, for example, may be selected from the group consisting of the recursive least squares (RLS) algorithm, various quantized state (QS) algorithms, LMS algorithm, Sato's algorithm, Goddard algorithm, neural based algorithm, the blind mode algorithm with hierarchical structure, or any other more general linear or nonlinear algorithm for obtaining the filtered estimates of the data symbols. In some embodiments, several versions of the same algorithm with different algorithm parameters, for example, the initial estimate of the equalizer weight vector, may be used in the estimation units.

BRIEF DESCRIPTION OF THE DRAWINGS

Various embodiments of the present invention are described here by way of example in conjunction with the following figures, wherein.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide systems and methods for blind mode equalization of signals received over time varying dispersive channels, and for recovering the data symbols transmitted from a source in blind mode.

Figure 1:
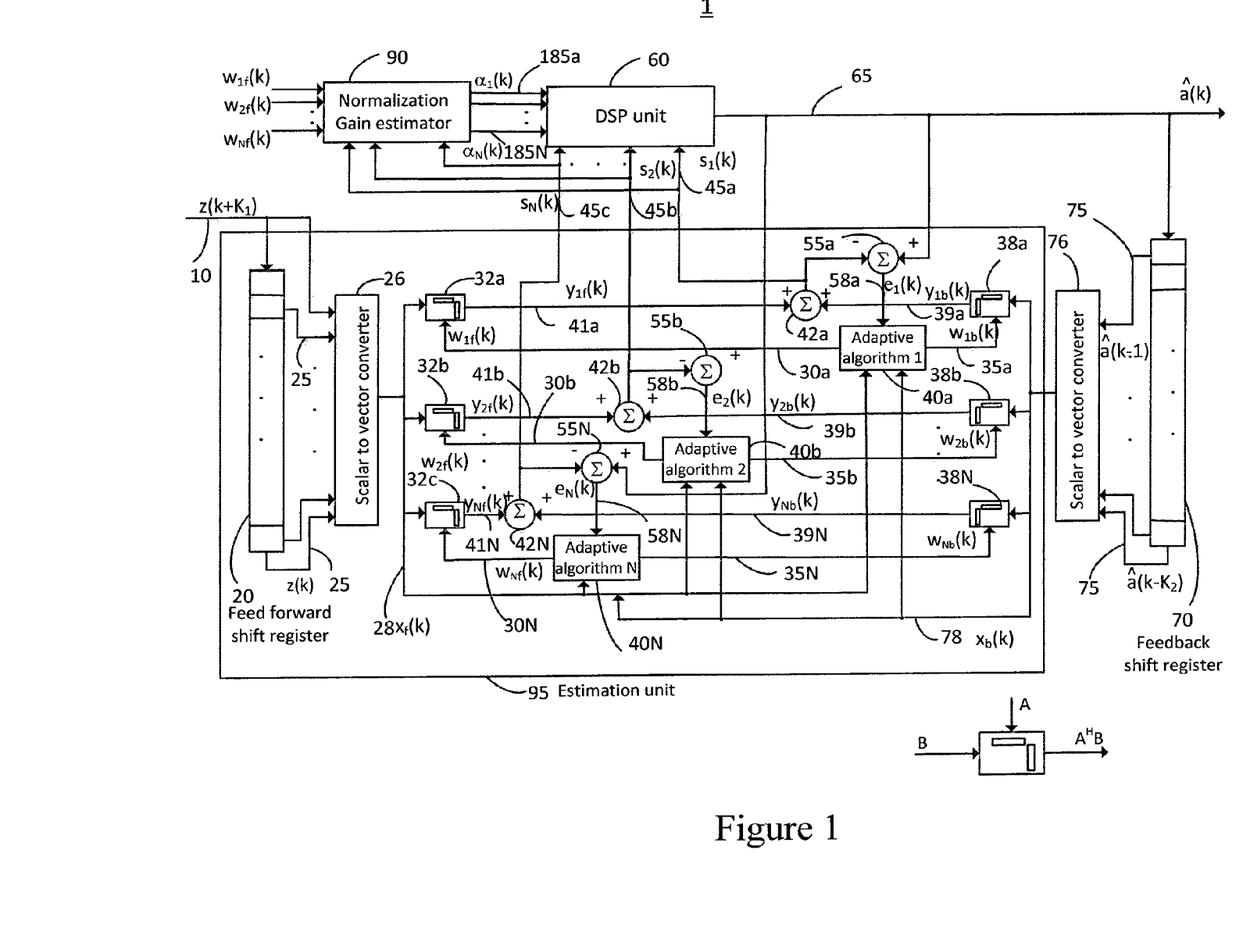
FIG. 1 shows a block diagram of one embodiment of blind mode adaptive equalizer system with multiple algorithms.

FIG. 1 shows the block diagram of one of the various embodiments of the invention. Referring to FIG. 1 the input 10 $z(k+K_1)$ wherein k denotes the discrete time with $K_1$ some constant integer, to the blind mode equalizer 1 is in general a complex valued signal that may be the output of the discrete-time channel, not shown, with impulse response h(k) and the input to the discrete-time channel given by the in general complex valued data symbol sequence a(k). The channel impulse response may be a slowly varying function of time.

The data symbol a(k) may take values from a set of M possible values for some integer M. For example, for the case of the QPSK modulation in digital communication systems, $a_k = a_{I,k} + j\, a_{Q,k}$, with $j = \sqrt{-1}$, and with $a_{I,k}$ and $a_{Q,k}$ denoting the real and imaginary components of $a_k$ taking possible values $+A_0$ and $-A_0$ for some constant $A_0 > 0$. For the case of MQAM modulation with the number of points M in the signal constellation equal to $N^2$ for some positive integer N that is normally selected to be an integer power of 2, each of $a_{I,k}$ and $a_{Q,k}$ may take possible values from the set of N values given by $\{\pm 1, \pm 3, \ldots, \pm(N-1)\} A_0$. Similarly for the MPSK modulation, $a_k$ takes possible values from the set of M values given by $\{A_0 \exp(j((2m-1)\pi/M); m=1, 2, \ldots, M\}$.

The output z(k) of the discrete-time channel is given by $$y_c(k) = \sum_{i=-M_1}^{M_1} h(i) a(k-i) = \overline{h}^H \overline{\chi}_k; \quad (1a)$$

$$\overline{\chi}_k = [a(k_0 + M_1), \ldots, a(k_0), \ldots, a(k_0 - M_1)]^T$$

$$\overline{h}^T = [h(-M_1) \ldots h(-1) h(0) h(1) \ldots h(M_1)] \quad (1b)$$

$$z(k) = y_c(k) + n(k); k=0, 1, \ldots \quad (1c)$$

wherein H denotes the conjugate transpose and T denotes the transpose operations.

Referring to FIG. 1, the complex valued signal $z(k+K_1)$ is inputted to the estimation unit 95. The complex valued signal $z(k+K_1)$ is inputted to the feed forward shift register 20 of length $K_1$ providing the delayed versions 25 $z(k+K_1-1), \ldots, z(k)$ of the input $z(k+K_1)$ to the scalar to vector converter 26 that provides the forward state vector 28 $x_f(k) = [z(k+K_1) z(k+K_1-1) \ldots z(k)]^T$ at the output of the scalar to vector converter 26. Referring to FIG. 1, the forward state vector $x_f(k)$ is inputted to the N vector inner product operators 32a, b, . . . , N. Throughout the description of the invention, the notations a, b, . . . , N and 1, 2, . . . , N for any integer ** are equivalent and both refer to the enumeration between 1 and N. The other inputs of the N vector inner product operators 32 are provided with the N equalizer forward weight vectors 30 $w_{1f}(k), w_{2f}(k), \ldots, w_{Nf}(k)$. Referring to FIG. 1, the N equalizer forward weight vectors 30 a, b, . . . , N are provided by the N adaptive algorithm blocks 40a, b, . . . , N respectively. Referring to FIG. 1, the outputs 41a, b, . . . , N $y_{1f}(k), y_{2f}(k), \ldots, y_{Nf}(k)$ are inputted to the adders 42a, b, . . . , N respectively. The other inputs of the adders 42a, b, . . . , N are provided with the feedback signals 39 $y_{1b}(k), y_{2b}(k), \ldots, y_{Nb}(k)$ respectively.

Referring to FIG. 1, the outputs 45a, b, . . . , N $s_1(k), s_2(k), \ldots, s_N(k)$ of the adders 42 denoting the N filtered estimates of the discrete-time channel input symbol a(k) are inputted to the DSP unit block 60. The DSP unit 60 is also inputted with the $\alpha$ parameters 185a, b, . . . , N $\alpha_1(k)$, $\alpha_2(k), \ldots, \alpha_N(k)$ made available from the normalizer gain estimator 90. The DSP unit processes the N filtered estimates 45 of the symbol a(k) and the N $\alpha$ parameter estimates 185 and provides the joint estimate 65 $\hat{a}(k)$ of the symbol at the output of the DSP unit. Referring to FIG. 1, the normalizer gain estimator 90 is inputted with the equalizer forward weight vectors 30a, b, . . . , N provided by the adaptive algorithm blocks 40a, b, . . . , N.

Referring to FIG. 1, the joint estimate 65 $\hat{a}(k)$ is inputted to the feedback shift register 70 that provides the $K_2$ delayed versions 75 of the joint estimate a(k) given by $\hat{a}(k-1)$, $\hat{a}(k-2), \ldots, \hat{a}(k-K_2)$ at the output of the feedback shift register. The delayed versions 75 $\hat{a}(k-1), \hat{a}(k-2), \ldots, \hat{a}(k-K_2)$ are inputted to the scalar to vector converter 76 that provides the feedback state vector $x_b(k) = [\hat{a}(k-1)\, \hat{a}(k-2) \ldots \hat{a}(k-K_1)]^T$ to the N vector inner product operators 38a, b, . . . , N. The other inputs of the N vector inner product operators 38 are provided with the N equalizer feedback weight vectors 35 $w_{1b}(k), w_{2b}(k), \ldots, w_{Nb}(k)$. Referring to FIG. 1, the N equalizer feedback weight vectors 35 a, b, . . . , N are provided by the N adaptive algorithm blocks 40a, b, . . . , N respectively.

In some embodiments of the invention, none of the N equalizer adaptive algorithms may be of the decision feedback type and thus $K_2$ is set equal to zero. In such embodiments, the feed forward shift register 20 is of length $(K_1+K_2)$ providing the delayed versions 25 $z(k+K_1-1), \ldots, z(k), \ldots, z(k-K_2)$ of the input $z(k+K_1)$ to the scalar to vector converter 26.

Referring to FIG. 1, the outputs 39a, b, . . . , N $y_{1b}(k)$, $y_{2b}(k), \ldots, y_{Nb}(k)$ are inputted to the adders 42a, b, N respectively. The signals 39a, b, . . . , N $y_{1b}(k), y_{2b}(k)$ are to compensate for any inter symbol interference contribution due to the past symbols wherein the $y_{1f}(k), y_{2f}(k), \ldots, y_{Nf}(k)$ inputs to the adders 42 compensate for the inter symbol interference contribution due to the future symbols.

Referring to FIG. 1, the N filtered estimates of the symbol a(k) given by $s_1(k), s_2(k), \ldots, s_N(k)$ at the outputs of the adders 42 are inputted to the adders 55 a, b, . . . , N respectively. The other inputs of the adders 55 a, b, . . . , N are provided with the joint estimate of the symbol $\hat{a}(k)$. The adders 55a, b, . . . , N compare the filtered estimates $s_1(k)$, $s_2(k), \ldots, s_N(k)$ with the joint estimate of the symbol $\hat{a}(k)$ providing the error signals $e_1(k), e_2(k), \ldots, e_N(k)$ to the N adaptive algorithm blocks 40a, b, . . . , N respectively. The adaptive algorithms adjust their estimates of the equalizer forward and feedback weight vectors so as to adaptively minimize some appropriate measures of the error signals $e_1(k), e_2(k), \ldots, e_N(k)$, such as the mean squared error, wherein different adaptive algorithm may use different such measures. Referring to FIG. 1, the N adaptive algorithm blocks 40a, b, . . . , N are inputted with the feed forward state vector $x^f(k)$ and the feedback state vector $x^b(k)$ for the adaptation of the equalizer weight vectors.

Referring to FIG. 1, the N adaptive algorithms 40a, b, . . . , N in various embodiments of the invention, may be selected from the various linear or nonlinear adaptive algorithms such as the LMS algorithm, the recursive least squares (RLS) algorithm, or the quantizes state algorithm with $\hat{a}(k)$ as the reference input, may be one of the blind mode algorithms such as the Sato or the Goddard algorithm or any other linear or nonlinear adaptive algorithm such as the one based on the neural networks. In various embodiments of the invention, some of the N adaptive algorithms may be same but with different algorithm parameters and possibly with different initial estimates for the equalizer weight vectors. Use of different adaptive algorithms in obtaining the joint estimate of the symbol a(k) may result in inheriting distinct advantages of the various adaptive algorithms, for example, some of the algorithms have faster convergence speed while the others may be more robust against modeling inaccuracies while some may be advantageous in terms of possibility of diverging to some spurious weight vectors.

Taking into account the gain introduced by the parameter $\alpha(k)$, the LMS adaptive algorithm is given by $$w_{iu}(k+1)=w_{iu}(k)+\mu(k)x(k)(\hat{a}(k)-s_i(k))^*; s_i(k)=w_{iu}^H x(k); \quad k=0,1,\ldots \quad (2a)$$

$$w_i(k+1)=\alpha_i^{-1}(k)w_{iu}(k+1) \quad (2b)$$

In (2a, b) $\hat{a}(k)$ is the joint symbol estimate provided by the DSP unit 60, $\mu(k)$ may be an appropriately selected sufficiently small positive scalar constant to achieve convergence or may be a decreasing positive function of k, * denotes complex conjugate operation and the equalizer state vector x(k) and the equalizer weight vector $w_i(k)$ of dimension $K=(K_1+K_2+1)$ given by $$x(k)=[x_f^H(k)x_b^H(k)]^H; w_i(k)=[w_{if}^H(k)w_{ib}^H(k)]^H \quad (3)$$

In (3) H denotes the Hermitian transpose and in (2) the initial estimate for the vector $w_{iu}(k)$ at k=0 may be selected equal to $[0\ 0\ \ldots\ 0\ 1\ 0\ \ldots\ 0]^H$ with the only nonzero element in the $(K_1+1)^{st}$ position equal to 1 and with $\alpha_i(0)$ selected equal to 1.

In various embodiments of the invention, one or more of the adaptive algorithms 40 may be the RLS algorithm given by $$\overline{w}_{iu}(k+1)=\overline{w}_{iu}(k)+\mu(k)R_k\overline{x}_k(\hat{a}(k)-s_i(k))^*; s_i(k)=w_{iu}^H x(k); \quad (4a)$$

$$R(k)=\lambda^{-1}[R(k-1)-R(k-1)\overline{x}_k(\overline{x}_k^H R(k-1)\overline{x}_k+\lambda)^{-1} \overline{x}_k^H R(k-1)]; k=1,2,\ldots \quad (4b)$$

$$w_i(k+1)=\alpha_i^{-1}(k)w_{iu}(k+1) \quad (4c)$$

In (4b) $\hat{a}(k)$ is the joint symbol estimate provided by the DSP unit 60, $\lambda$ with $0<x\le1$ is the exponential weighting coefficient that determines the effective averaging period in the evaluation of R(k) that may be initialized at time k=0 by a diagonal matrix $\epsilon_R I_K$ for some small positive scalar $\epsilon_R$ with $I_K$ denoting the (K×K) identity matrix. Use of the RLS algorithm as one of the N algorithms 40 in the system of FIG. 1 may result in a faster convergence of the multiple algorithm blind mode equalizer. In various embodiments of the invention that involve use of the RLS algorithms in more than one of the algorithm blocks 40a, b, . . . , N, the different versions of the RLS algorithm may have different initial conditions for $w_u(k)$ at k=0 and possibly use different values of $\lambda$.

In various other embodiments of the invention one of the adaptive algorithms 40 may be one of the quantized state algorithms such as the QS1 algorithm given by $$w_{iu}(k+1) = \quad (5a)$$
$$w_{iu}(k) + \mu(k)P_i^q(k)\left[x^q(k) + \frac{x^{qH}(k)x(k)}{x^q(k)x(k)}x(k)\right] \times (\hat{a}(k)-s_i(k))^*;$$
$$s_i(k) = w_{iu}^H x(k)$$

$$P^q(k)=\lambda P^q(k-1)+(1-\lambda)x^q(k)x^H(k)+(1-\lambda)x(k)x^{qH}(k)+(1-\lambda)\epsilon I \quad (5b)$$

$$w_i(k+1)=\alpha_i^{-1}(k)w_{iu}(k+1); P_i^q(k)=[P^q(k)]^{-1} \quad (5c)$$

In (5b, c) the matrix $P_i^q(k)$ may be updated directly without requiring the matrix inversion with the application of the matrix inversion lemma to the update in (5b) and $P_i^q(k)$ at k=0 may be initialized by a diagonal matrix $\epsilon_P I_K$ for some small positive scalar $\epsilon_P$ with $I_K$ denoting the (K×K) identity matrix.

In (5) the vector $x^q(k)$ is obtained by replacing both the real and imaginary components of the various elements of the vector x(k) with their quantized versions. The $i^{th}$ component of $x^q(k)$ is given by (6).

$$x_i^q(k)=g_T(Re(x_i(k)))+jg_T(Im(x_i(k))); j=\sqrt{-1}=1,2,\ldots,K \quad (6)$$

In (6) $g_T(x)$ for x real is the threshold function defined in (7), and Re(z) and Im(z) denote the real and imaginary components of z for any complex variable z.

$$g_T(x) = \begin{cases} +1; x > v_{th} \\ -1; x < -v_{th} \\ 0; |x| < v_{th} \end{cases} \quad (7)$$

In (7) $v_{th}$ is some positive threshold value that may be set equal to 0 in which case the function $g_T(x)$ reduces to the signum function. The function $g_T(x)$ may be modified such that for $|x|<v_{th}$, the function $g_T(x)$ is equal to $\epsilon$ sgn(x) for some small positive scalar $\epsilon$ and with the signum function sgn(x) given by (10).

In various embodiments of the invention one of the adaptive algorithms 40 may be the Sato's algorithm given by $$w_{iu}(k+1)=w_{iu}(k)+\mu(k)x(k)[\gamma_1 sgn(s_i(k))-s_i(k)]^*; s_i(k)=w_{iu}^H x(k); k=0,1,\ldots \quad (8a)$$

$$w_i(k+1)=\alpha_i^{-1}(k)w_{iu}(k+1) \quad (8b)$$

In (8a) $\gamma_1$ is given by $$\gamma_1=E[|a(k)|^2]\{E[|a(k)|]\}^{-1} \quad (8c)$$

and $sgn(s_i(k))$ in (8a) is obtained by replacing both the real and imaginary components of $s_i(k)$ with 1 bit quantized versions with $$sgn(s_i)=sgn(Re(s_i))+j\,sgn(Im(s_i)); j=\sqrt{-1} \quad (9)$$

In (9) Re(z) and Im(z) denote the real and imaginary components of z for any complex variable z and sgn(x) for x real is the signum function defined in (10).

$$sgn(x) = \begin{cases} +1; x > 0 \\ -1; x \le 0 \end{cases} \quad (10)$$

For the specific case of BPSK modulation wherein a(k) takes values +1 and −1 with probability 0.5, $\gamma$ in (8c) is equal to 1 and the Sato's algorithm is same as the LMS algorithm in the decision directed mode.

In the various embodiments of the invention one of the adaptive algorithms 40 may be the Godard's algorithm given by $$w_{iu}(k+1)=w_{iu}(k)+\mu(k)x(k)s_i^*(k)|s_i(k)|^{p-2}[\gamma_p-|s_i(k)|^p]; \quad (11a)$$

$$w_i(k+1)=\alpha_i^{-1}(k)w_{iu}(k+1); s_i(k)=w_{iu}^H x(k); \gamma_p = E[|a(k)|^{2p}]\{E[|a(k)|^p]\}^{-1} \quad (11b)$$

In (11) p is any positive integer wherein for the case of p=2 the algorithm in (11a) reduces to $$w_{iu}(k+1)=(k)+\mu(k)x(k)s_i^*(k)[\gamma_p-|s_i(k)|^2]; \quad (12)$$

In case of Sato's and Goddard's algorithms in (8)-(12), the correction term in the weight update algorithm depends directly upon the filtered signal $s_i(k)$ instead of the error term $e_i(k)=(\hat{a}(k)-s_i(k))$. In such cases the estimation unit 95 in FIG. 95 may be modified by feeding back the signal 45i $s_i(k)$ to the adaptive algorithm 40i.

In some of the various embodiments of the invention one of the adaptive algorithms 40 may be a nonlinear algorithm wherein the estimate of the symbol $s_i(k)$ is a nonlinear function of the state vector x(k) instead of the linear function given in the algorithms described by (4)-(12). For example, the estimate of the symbol $s_i(k)$ may be obtained by neural network based implementation. For example, a superfast neural network based algorithm is taught in, "Superfast and Efficient Channel Equalizer Architecture Based on Neural Network," IEEE International Conference on Aerospace Engineering, Big Sky, Mont., March 2012, pp. 1-11, that is included in its entirety as part of this application. While the neural network based algorithm is very fast in convergence, it requires a training sequence. With one of the N algorithms 40 in FIG. 1 selected to be the neural network based algorithm with another one, for example, based on Sato's algorithm an overall very fast convergence may be achieved in the blind mode.

Figure 2:
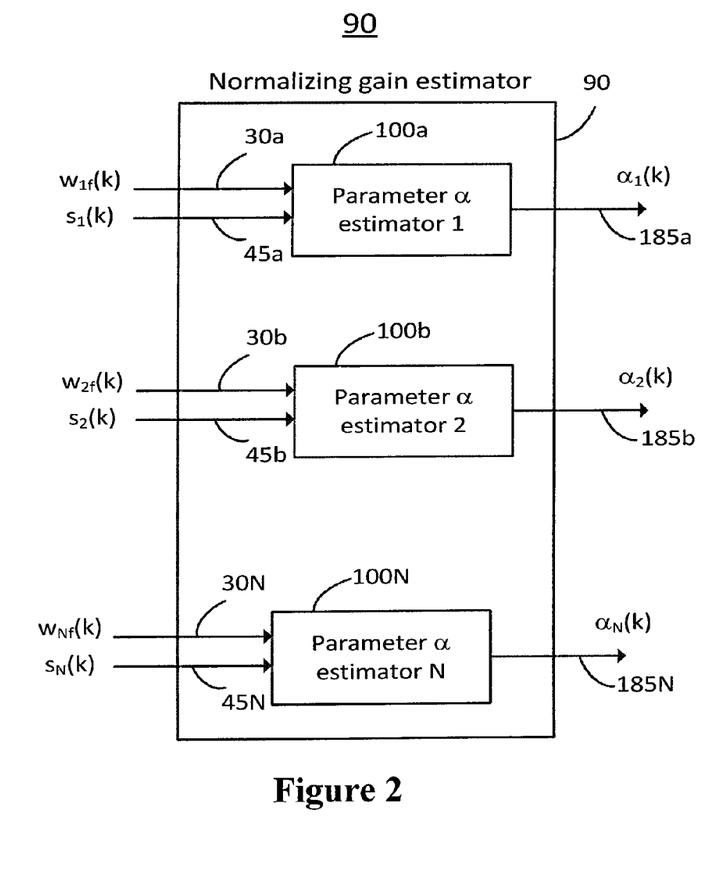
FIG. 2 is shows a block diagram of one embodiment of normalizing gain estimator.

FIG. 2 shows the block diagram of the normalizing gain estimator 90. Referring to FIG. 2, the normalizing gain estimator is comprised of a bank of N parameter α estimation units 100a through N. Referring to FIG. 2, the parameter α estimation units 100i receives the equalizer feed forward weight vector 30i $w_{i,f}(k)$ and the filtered estimate 45i $s_i(k)$ form the estimation unit 95 of FIG. 1 and provides the parameter $α_i$ estimate 185i to the DSP unit 60 of FIG. 1 for i= 1,2, . . . , N.

Figure 2A:
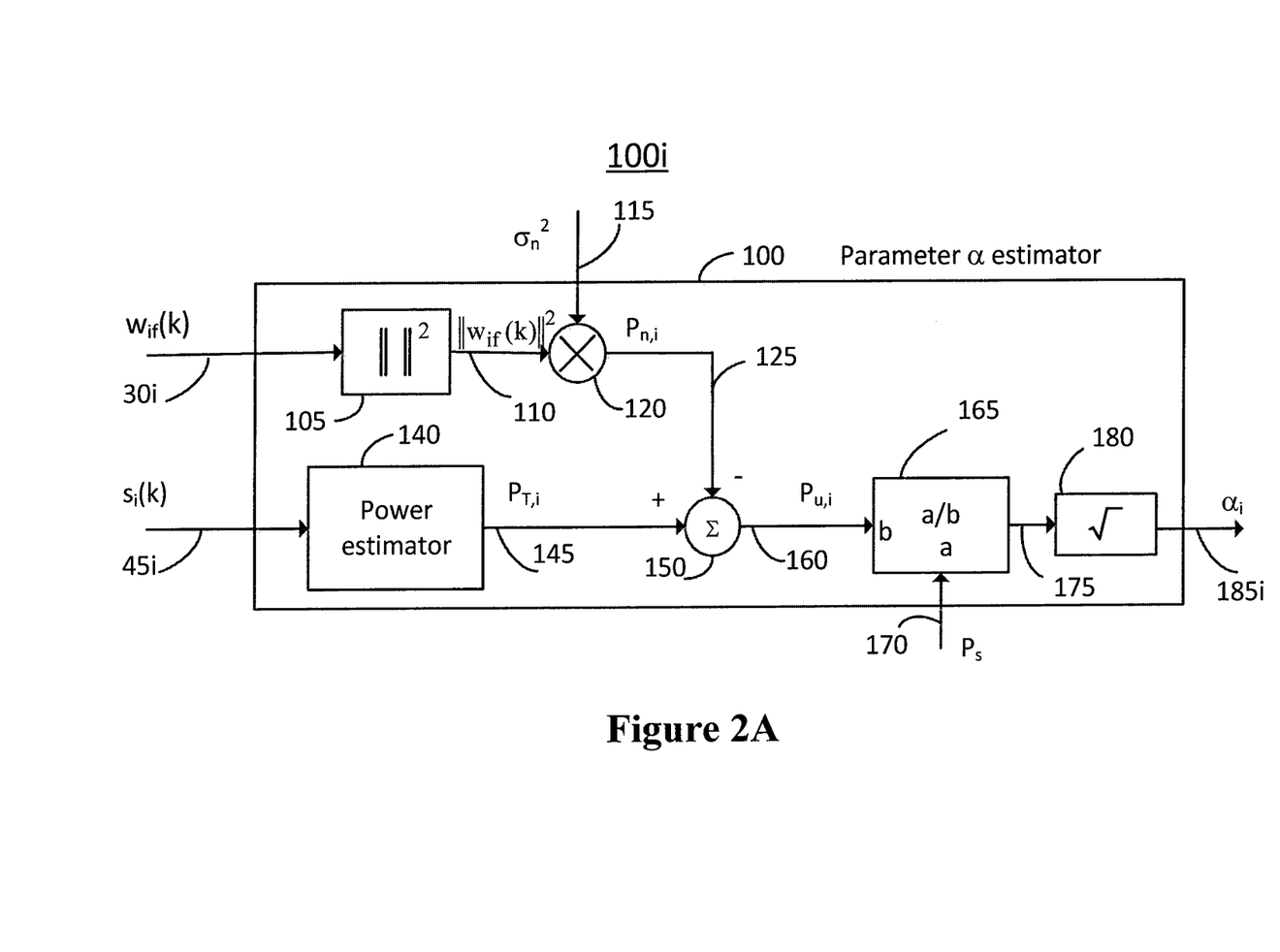
FIG. 2A shows a block diagram of one embodiment of parameter $\alpha$ estimator.

FIG. 2A shows the block diagram of the unit 100i parameter α, estimator for estimating the parameter $α_i$. Referring to FIG. 2A, the equalizer feed forward weight vector 30i $w_{i,f}(k)$ is inputted to the norm square block 105 that provides the norm square 110$\|w_{i,f}(k)\|^2$ to the input of the multiplier 120. The other input of the multiplier 120 is provided with the variance $\sigma_n^2$, or an appropriate estimate of $\sigma_n^2$, of the noise n(k) at the discrete-time channel output. The output 125 $P_{n,i}$ of the multiplier 120 is an estimate of the noise power present in the $i^{th}$ equalizer output 45i $s_i(k)$.

Referring to FIG. 2A, the $i^{th}$ equalizer output 45i $s_i(k)$ is inputted to the power estimator block 140 that provides the estimate of the total power $P_{T,i}(k)$ in the signal $s_i(k)$ at the output 145. The power estimate block 140 may estimate the power $P_{T,i}(k)$ according to (13).

$$P_{c,i}(j)=\lambda_p P_{c,i}(j-1)+|s_i(j)|^2; j=1,2; \ldots \quad (13a)$$

$$P_{T,i}(k)=P_{c,i}(k)(1-\lambda_p)/(1-\lambda_p^k) \quad (13b)$$

In (13), $\lambda_p$ with $0<\lambda_p<1$ is the exponential weighting coefficient that determines the effective averaging period in the evaluation of the power $P_{T,i}(k)$ wherein the initial value of $P_{T,i}(0)$ may be set equal to 0.

Referring to FIG. 2A, the $i^{th}$ equalizer output noise power $P_{n,i}$ is subtracted from the total power estimate $P_{T,i}(k)$ by the adder 150 providing the signal power estimate 160 $P_{u,i}$ to the input of the divider 165. The other input 170 of the divider 165 is provided with the average power $P_s$ of the symbol $a_k$ at the discrete-time channel output with $P_s=E[|a_k|^2]$ wherein E denotes the expected value operator. The divider block 165 divides the power $P_s$ by the estimate of the signal power $P_{u,i}$ at the $i^{th}$ equalizer output and provides the result 175 ($P_s/P_{u,i}$) to the square root block 180. The square root block provides the estimate of the parameter $α_i$ at the output 185i. The parameter $α_i$ is used by the DSP unit 60 to scale the signal $s_i(k)$ such that the signal power at the output of the $i^{th}$ equalizer is close to $P_s=E[|a_k|^2]$ as would be the case when the equalizer has converged and thus speeds up the convergence of the multi algorithm equalizer of FIG. 1. In some embodiments of the invention, the parameter α, may not be updated after an initial convergence period.

Figure 3:
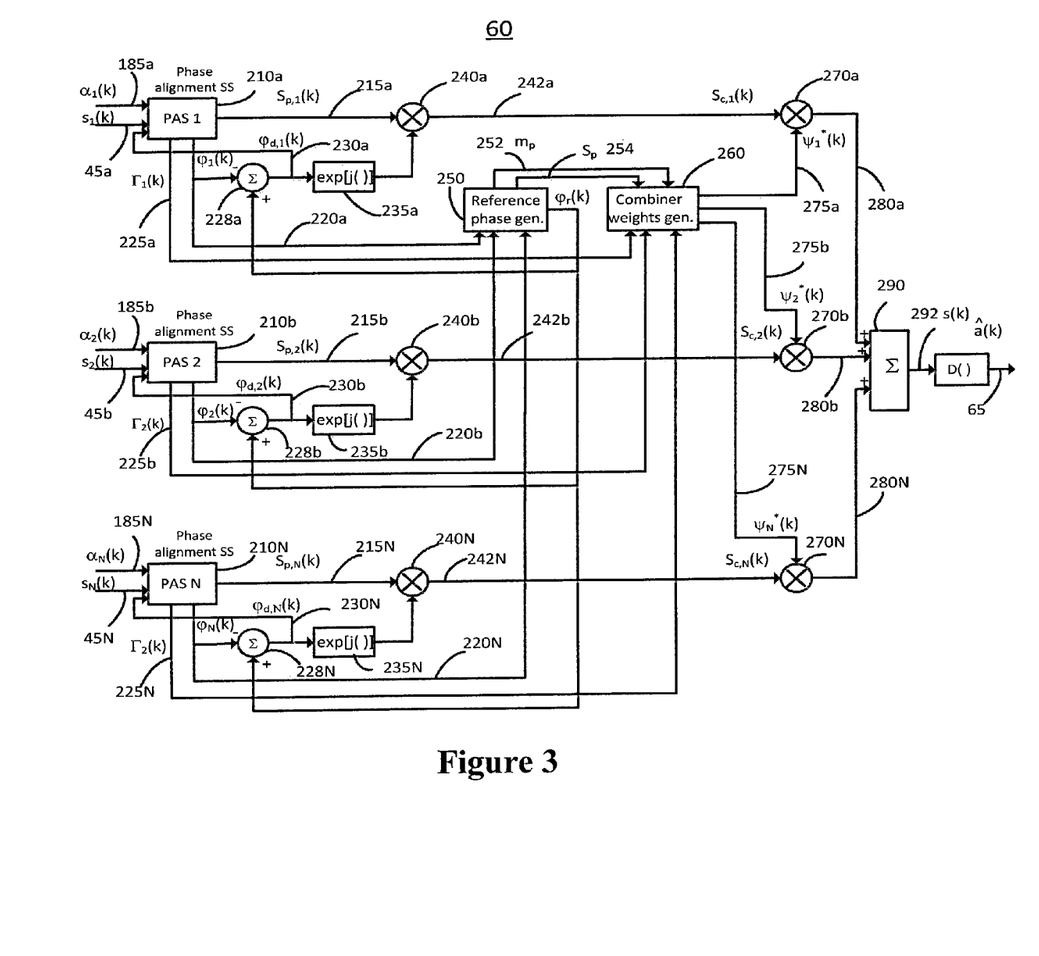
FIG. 3 shows a block diagram of one embodiment of DSP unit.

FIG. 3 shows the block diagram of the DSP unit 60. Referring to FIG. 3, the parameter 185a $α_1(k)$ and the filtered symbol estimate 45a $s_1(k)$ provided by the first equalizer are inputted to the phase alignment subsystem unit 210a PAS1. The phase alignment subsystem unit 210a PAS1 normalizes the signal power present in the input $s_1(k)$ to $P_s$ with the gain $a_1(k)$ and aligns the phase of the signal $s_1(k)$ with the filtered symbol estimates 45b, . . . , N $s_2(k)$, $s_N(k)$ provided by the equalizers 2 through N and provides the gain normalized and phase aligned signal $s_{p,1}(k)$ at the output 215a. In a likewise manner the phase alignment subsystem units 210b through N PAS 2, . . . , PAS N normalize the signal power present in the inputs $s_2(k), \ldots, s_N(k)$ to $P_s$ with the gains $α_2(k), \ldots, α_N(k)$, and align the phase of the signals $s_2(k), \ldots, s_N(k)$ with $s_1(k)$ and with each other providing the gain normalized and phase aligned signal $s_{p,2}(k), \ldots, s_{p,N}(k)$ at the outputs 215a through N.

Figure 4:
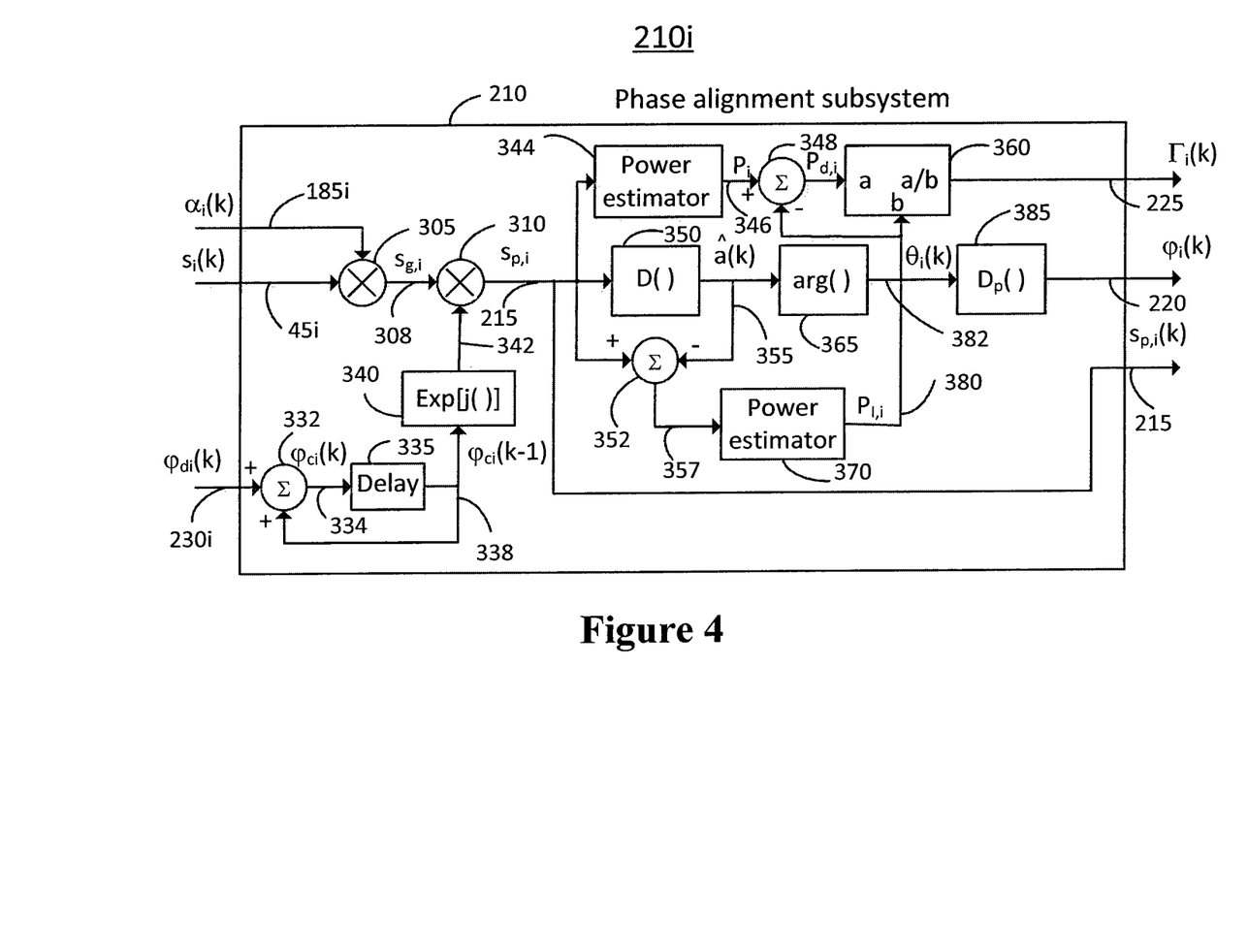
FIG. 4 shows a block diagram of one embodiment of phase alignment subsystem.

FIG. 4 shows the block diagram of the phase alignment subsystem unit 210i for i=1, 2, . . . , N. Referring to FIG. 4, the filtered symbol estimate 45i $s_i(k)$ provided by the $i^{th}$ equalizer comprised of the adaptive algorithm block 40i, is inputted to the multiplier 305. The other input of the multiplier 305 is inputted with the parameter 185i $α_i(k)$. The multiplier 305 provides the gain normalized signal 308 $s_{g,i}=α_i(k) s_i(k)$ to the multiplier 310. Referring to FIG. 4, the other input of the multiplier 310 is connected to the output of the exponential function block 340 that provides the output 342 exp [$j\phi p_{c,i}$ (k-1)], $j=\sqrt{-1}$, to the multiplier 310 wherein $\phi_{c,i}(k-1)$ is the requisite phase rotation performed on the signal $s_i(k)$ for the purpose of the phase alignment. Referring to FIG. 4, the gain normalized and phase aligned signal 215 $s_{p,i}$ is inputted to the decision device 350 that provides the detected signal 355 $â_i(k)$ at the output of the decision circuit computed according to the decision function Δ( ).

The selection of the decision function Δ( ) depends upon the probability distribution of the data symbols $a_k=a_{I,k}+j a_{Q,k}$, with $j=\sqrt{-1}$, and with $a_{I,k}$ and $a_{Q,k}$ denoting the real and imaginary components of $a_k$. For example, for the case of the discrete type of the probability distribution of the data symbols $a_k$ with both the real and imaginary components $a_{I,k}$ and $a_{Q,k}$ of $a_k$ taking possible values from the finite sets $\Sigma_I$ and $\Sigma_Q$ respectively and where the components $a_{I,k}$ and $a_{Q,k}$ are statistically independent as is the case, for example, for the MQAM modulated signals, the decision function may be given by (14).

$$D(â_{I,k}+jâ_{Q,k})=D_I(â_{I,k})+jD_Q(â_{Q,k}) \quad (14)$$

In (14) the functions $\Delta_I( )$ and $\Delta_Q( )$ may be the slicer functions. For the specific case when both the sets $\Sigma_I$ and $\Sigma_Q$ are equal to the set $\{\pm 1, \pm 3, \ldots, \pm(N-1)\} A_0$ for some positive constant $A_0$ and some integer N, the two slicer functions $\Delta_I(x)$ and $\Delta_Q(x)$ with x real, are identical and are given by (15).

$$D_I(x)=D_I(x)=D_m(|x|)sgn(x) \quad (15)$$

In (15), sgn(x) is the signum function given by (10) and the function $D_m(|x|)$ is given by $$D_m(|x|)=iA_0; V_{t_{i-1}}\le |x|<V_{t_i}; i=1,2,\ldots,N/2 \quad (16)$$

In (16), $V_{t_i}$ for i=0, 1, . . . ,N/2 are the threshold levels given by $$V_{t_i} = \begin{cases} 0; i=0 \\ 2iA_0; 0<i<N/2 \\ \infty; i=N/2 \end{cases} \quad (17)$$

The decision function described by (14)-(17), for example, applies to the case where $a_k$ is obtained as a result of MQAM modulation, with the number of points in the signal constellation $M=N^2$. For other modulation schemes and different probability distributions of the data symbol, other appropriate decision functions may be employed. For the specific case of M=4 corresponding to the QPSK modulation, the decision function in (20) reduces to $$D(\hat{a}_{I,k}, j\hat{a}_{Q,k}) = sgn(\hat{a}_{I,k}) + jsgn(\hat{a}_{Q,k}) \quad (18)$$

For the case of MPSK modulation with M>4, the decision device may comprise of a normalizer that normalizes the complex data symbol by its magnitude with the normalized data symbol operated by the decision function in (14)-(15). Referring to FIG. 4, the detected symbol 355 $\hat{a}_i(k)$ is inputted to the block 365 that evaluates the phase 382 $\theta_i(k)$ of the detected symbol $\hat{a}_i(k)$. The phase 382 $\theta_i(k)$ is inputted to the phase threshold device 385 that provides the output 220 $\phi_i(k)$ according to the decision function $\Delta_p(\ )$ given by (19).

$$\phi_i(k) = D_p(\theta_i(k)) = \theta_{r,j}; \theta_{t_j \le \theta_i}(k) < \theta_{t_{j+1}}, j = 0, 1, \ldots, S-1 \quad (19)$$

In (19) $N_s$ denotes the order of symmetry of the signal constellation diagram of the symbol $\hat{a}(k)$ equal to the number of distinct phase rotations of the signal constellation diagram that leave the signal constellation unchanged and is equal to the number of phase ambiguities that may be introduced by the blind mode equalizer. In (19) $\theta_{t_j}; j = 0, 1, \ldots, N_s$ are the $N_s$ threshold levels of the phase threshold device 385.

As an example of the threshold values in (19), the signal constellation diagram of the MQAM signal with a square grid constellation with the number of points in the signal constellation M equal to $N^2$ for some integer N, has order of symmetry $N_s$ equal to 4 with the possible phase ambiguities equal to 0, $\pi/2$, $\pi$, $3\pi/2$ as the rotation of the signal constellation diagram by any of the four values 0, $\pi/2$, $\pi$, $3\pi/2$ leaves the signal constellation unchanged. The threshold levels for the MQAM signal are given by $\theta_{t_0} = 0$, $\theta_{t_1} = \pi/2$, $\theta_{t_2} = \pi$, $\theta_{t_3} = 3\pi/2$. The range of the phase given by $\theta_{t_j} \le \theta_i(k) < \theta_{t_{j+1}}$ defines the $i^{th}$ sector of the signal constellation diagram equal to the $i^{th}$ quadrant of the signal constellation diagram for i=0, 1, 2, 3. The output of the phase threshold device 385 is equal to one of the phase values $\theta_{r,0} = \pi/4$, $\theta_{r,1} = 3\pi/4$, $\theta_{r,2} = 5\pi/4$, and $\theta_{r,3} = 7\pi/4$ depending upon the sector in which the input phase $\theta_i(k)$ lies.

For the case of MPSK signal, wherein $a_k$ takes possible values $A_0 \exp[j(m+0.5)2\pi/M]$, j=; m=0, 1, ..., (M-1) for some integer M that is normally taken equal to an integer power of 2. For the case of MPSK modulation, order of symmetry $N_s$ equal to M with the possible phase ambiguities equal to 0, $2\pi/M$, $\pi$, $4\pi/M$, ... $[2(M-1)\pi/M]$ resulting in M sectors with the $m^{th}$ sector defined in terms of the phase $\theta$ by the interval $2\pi m/M \le \theta < 2\pi(m+1)/M$, m=0, 1, ..., M-1. In various alternative embodiments of the invention, the number of sectors may be selected equal to 4 corresponding to the four quadrants of the signal space for any signal constellation. For the case of real symbols a(k) and real channel impulse response h(k), the number of sectors may be just equal to 2 corresponding to the sign of the signal 308 $s_{g,i}$ and phase rotation is replaced by a sign inversion.

As the different adaptive algorithms 40 may converge with any of the S possible phase ambiguities, to achieve coherence among the N different algorithms and thereby speed up the convergence, the phase of the filtered signals $s_1(k), \ldots, s_N(k)$ are aligned to a common phase reference. The phase alignment may be achieved by first determining a reference $\phi_r(k)$ among the N phase outputs $\phi_i(k)$, i=0, N and then aligning all the phase of $s_i(k)$, i=0, 1, ..., N by adjusting the phase of $s_i(k)$ by the difference $\phi_{d,i}(k) = (\phi_r(k) - \phi_i(k))$. The phase reference $\phi_r(k)$, for example, may be selected on the basis of the estimate of the signal to interference plus noise power ratio in the detected signal $\hat{a}_1(k)$.

Referring to FIG. 4, the gain normalized and phase aligned signal 215 $s_{p,i}$ is inputted to the power estimator 344 that provides the estimate of the total power 346 $P_i$ present in the signal $s_{p,i}$ to the input of the divider 360. The power $P_i$ may be estimated according to (13) with $s_i$ replaced by $s_{p,i}$. Referring to FIG. 4, the signals 215 $s_{p,i}$ and the detected symbol $\hat{a}_i(k)$ are inputted to the adder 352 that provides the difference 357 equal to $\tilde{a}_i(k) = (s_{p,i}(k) - \hat{a}_i(k))$ to the power estimator 370.

After the convergence of the $i^{th}$ equalizer the detected symbol $\hat{a}_i(k)$ is equal to the correct symbol with a possible phase ambiguity and is the equalization error $\tilde{a}_i(k)$ comprised of the residual noise and intersymbol interference. Referring to FIG. 4, the equalization error $\tilde{a}_i(k)$ is inputted to the power estimator 370 that provides the estimate of the residual noise and intersymbol interference power $P_{I,i}$ to the divider 360. Referring to FIG. 4, the power estimate 380 $P_{I,i}$ is inputted to the adder 348. The adder 348 provides the estimate of the signal power 348 $P_{d,i} = (P_i - P_{I,i})$ to the divider 360. Referring to FIG. 4, the divider 360 divides the estimate of the signal power $P_{d,i}$ by the estimate of the residual noise and inter symbol interference power $P_{I,i}$ providing the signal to residual noise plus interference power ratio 225 $\Gamma(k) = (P_{d,i}/P_{I,i})$ at the output of the divider 360.

Referring to FIG. 3, the N phase outputs $\phi_1(k), \phi_2(k), \ldots, \phi_N(k)$ at the outputs of the phase alignment subsystems 210 1, ..., N are inputted to the reference phase generator 250. The reference phase generator 250 partitions the phase outputs $\phi_1(k), \phi_2(k), \ldots, \phi_N(k)$ into a number of $N_p$ sets such that the phase of all the terms in any one of the partitions are equal and equal to one of the reference phase. For example, for the case of MQAM signal with square grid constellation S is equal to 4 and the reference phase are equal to $\theta_{r,0} = \pi/4$, $\theta_{r,1} = 3\pi/4$, $\theta_{r,2} = 5\pi/4$, and $\theta_{r,3} = 7\pi/4$. Referring to FIG. 3, the set $S_p$ of the indices of the terms in the partition with the maximum number of phase terms, wherein the indices take values in the range of 1 to N, and the number of terms $m_p$ in $S_p$ is inputted to the combiner weights generator block 260. For the case wherein, more than one partitions have the number of terms equal to the maximum value $m_p$, the partition containing the term with the highest SNR $\Gamma_i$ is selected to break the tie. Referring to FIG. 3, the SNR $\Gamma_i$ is made available to the reference phase generator 250 by the phase alignment subsystem 210i for i equal to a through N, not shown in the Figure. Referring to FIG. 3, the reference phase is set equal to the value of the phase $\phi_r(k)$, i=1, 2, ..., N in the partition thus selected.

Referring to FIG. 3, the reference phase $\phi_r(k)$ generated by the reference phase generator 250 is inputted to the adders 228 a, b, ..., N. Referring to FIG. 3, the phase $\phi_i(k)$ at the output 220i of the phase alignment subsystem 210i is inputted to the adder 228i for i equal to a through N. The adder 228i subtracts the phase $\phi_i(k)$ from the reference phase and feeds back the difference 230i $\phi_{d,i}(k)$ to the input of the phase alignment subsystem 210i.

Referring to FIG. 4, the difference phase 230i $\phi_{d,i}(k)$ is accumulated by the accumulator comprised of the adder 332 and the delay 335 providing the accumulated phase 334 $\phi_{c,i}(k)$. The delayed version 338 $\phi_{c,i}(k-1)$ of the phase 334 $\phi_{c,i}(k)$ is inputted to the complex exponential operation block 340. Referring to FIG. 4, the output 342 of the complex exponential operation block 340 given by exp $[j\phi_{c,i}(k-1)]$, $j = \sqrt{-1}$ is inputted to the multiplier 310 that introduces a phase rotation of $\phi_{c,i}(k-1)$ in the phase of the other input 308 $s_{g,i}(k)$ of the multiplier 310. Referring to FIG. 4, the phase aligned signal 215 $s_{p,i}$ is made available to the decision device 350.

Referring to FIG. 3, the difference phase 230i the difference phase 230i $\phi_{d,i}(k)$ is inputted to the exponential function block 235i that provides the output $\exp[j\,\phi_{d,i}(k)]$, $j=\sqrt{-1}$ to the multiplier 240i for i equal to 1 through N. Referring to FIG. 3, the other input of the multiplier 240i is connected to the gain normalized and phase aligned signal $s_{p,i}$ output 215i made available by the phase alignment subsystem 210i. Referring to FIG. 3, the multiplier 240i adjusts the phase of the signal $s_{p,i}$ by the difference phase 230i $\phi_{d,i}(k)$ and provides the phase adjusted signal $s_{c,i}$ at the output 242 i to the input of the multiplier 270i for i equal to 1 through N.

Referring to FIG. 3, the outputs of the multipliers 270i, i=1, 2, ..., N are inputted to the adder 290. The adder 290 provides the weighted sum s(k) of the phase adjusted signals $s_{c,1}, \ldots, S_{c,N}$ at the output 292. The multipliers 270i, i=1, 2, ..., N and the adder 290 constitute the weighted combiner for the phase adjusted signals $s_{c,i}(k)$.

Referring to FIG. 3, the SNR $\Gamma_i$ is made available to the combiner weight generator 260 by the phase alignment subsystem 210I, for i equal to a through N. On the basis of the SNRs $\Gamma_i$ equal to a through N, and the set $S_p$ and the number of elements $m_p$ in the set $S_p$ made available by the reference phase generator 250, the combiner weight generator 260 generates the weights $\psi_1, \psi_2, \ldots, \psi_N$ that may be in general complex valued. The complex conjugates of the combiner weights $\psi_1, \ldots, \psi_N$ are made available to the multipliers 270i, i=1, 2, ..., N by the combiner weight generator 260.

In various embodiments of the invention, the combiner weights may be based on the maximal ratio combining technique wherein the combiner weights are given by (20).

$$\psi_i = \Gamma_i / \Gamma; \Gamma = \sum_{i=1}^{N} \Gamma_i; i = 1, 2, \ldots, N \qquad (20)$$

In various embodiments of the invention, all of the weights $\psi_i$ may be set equal to 1/N corresponding to the equal gain diversity combining technique. In yet other embodiments of the invention, the weight corresponding to the highest SNR $\Gamma_i$ may be set equal to 1 with all of the other (N−1) weights set equal to 0 corresponding to the switched diversity combining technique.

In some of the embodiments of the invention, nonzero weights may be assigned only to the signals with their indices in the set $S_p$ with the signals with their indices not in the set $S_p$ assigned zero weights. The weights with their indices within the set $S_p$ may be given by (21).

$$\psi_i = \Gamma_i / \Gamma_s; \Gamma_s = \sum_{i \in S_p} \Gamma_i \text{ for } i \in S_p; \psi_i = 0 \text{ for } i \notin Sp \qquad (21)$$

In alternative embodiments of the invention, all of the weights with their indices in the set $S_p$ may be set equal to $1/m_p$ wherein $m_p$ is the number of indices in the set $S_p$, with the weights with their indices not in the set $S_p$ assigned the value 0. In yet other embodiments of the invention, the weight with its index in the set $S_p$ corresponding to the highest SNR may be set equal to 1 with all of the (N−1) weights set equal to 0.

In various other embodiments of the invention, the combiner weights may be based on one of the adaptive algorithm selected from the set of RLS, LMS, QS, Sato's and Goddard's algorithms. For example, using the Sato's algorithm the combiner weight vector $\psi=[\psi_1\psi_2, \ldots, \psi_N]^T$ may be updated by (22).

$$\Psi(k+1)=\psi(k)+\mu(k)\xi(k)[\gamma_1 sgn(g(k))-g(k)]^*; g(k)=\psi^H(k)\xi(k) \qquad (22a)$$

$$\xi(k)=[s_{c,1}(k)s_{c,2}(k)\ldots s_{c,N}(k)]^T; k=0,1,\ldots \qquad (22b)$$

$$\gamma_1=E[|a(k)|^2]\{E[a(k)|]\}^{-1} \qquad (22c)$$

In (22a) $\mu(k)$ may be an appropriately selected sufficiently small positive scalar constant to achieve convergence or may be a decreasing positive function of k.

In various embodiments of the invention, the data symbols a(k) are transmitted over $N_c$ diversity channels with impulse responses $h^i(k)$, i=1, 2, ..., $N_c$ and the receiver jointly detects the data symbol a(k) on the basis of the $N_c$ signals received over the $N_c$ diversity channels. The impulse responses may be slowly varying functions of time to which the receiver adapts. In addition to the wireless communication, such situations arise in many other fields, for example, in Radar systems.

Figure 5:
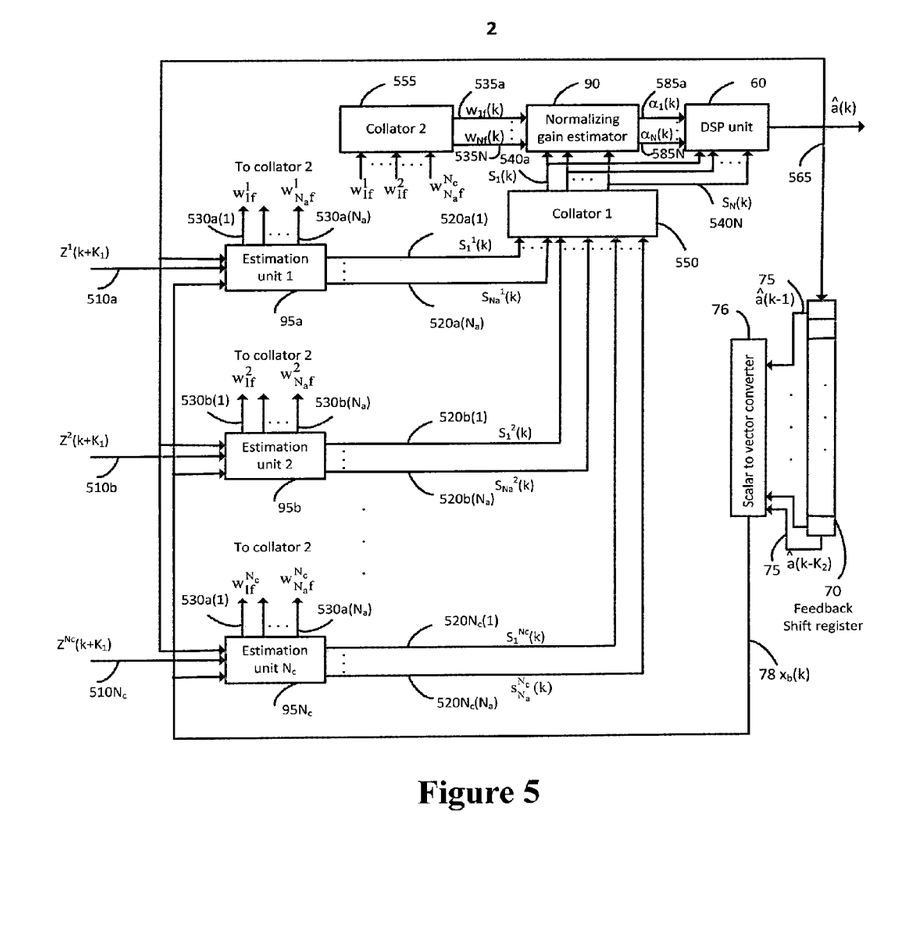
FIG. 5 shows the block diagram of one embodiment of equalizer system for dispersive diversity channels.

FIG. 5 shows the block diagram of one of the embodiments of the invention wherein the signal is received over dispersive diversity wireless channel with order of diversity $N_c$. Referring to FIG. 5, the signals received over the diversity channels 510a, b, ..., $N_c$ $z^1(k+K_1), z^2(k+K_1), \ldots, z^N(k+K_1)$, wherein $K_1$ is a positive integer, are inputted to the blind mode equalizer system 2. Referring to FIG. 5, the signals 510a, b, ..., N are inputted to the bank of estimation units 95a, b, ... $N_c$ respectively, of the blind mode equalizer 2. The estimation units 95a, b, ... $N_c$ have the same block diagrams as that of the estimation unit 95 in FIG. 1 except for the added superscripts i in various expressions $w_{jf}^i(k)$, $s_j^i(k)$, etc., to designate the estimation unit number i=1, 2, ..., $N_c$ of FIG. 5 and N in the unit 95 of FIG. 1 is replaced by $N_a$ in the estimation units of FIG. 5.

Referring to FIG. 5, the estimation unit 95i generates the filtered signals 520i(1, 2, ..., $N_a$) $s_1^i, s_2^i, \ldots, s_{N_a}^i$ wherein $N_a$ is the number of adaptive algorithms in the estimation unit 95i. In some embodiments of the invention, the number of adaptive algorithms in the various estimation units may be different. Referring to FIG. 5, the N=$N_c N_a$ filtered signals $s_1^1, s_2^1, \ldots, s_{N_a}^1, \ldots, s_1^{N_c}, s_2^{N_c}, \ldots, s_{N_a}^{N_c}$ are inputted to the collator 550 that collates the N filtered signals and makes the collated filtered signals 540a though N $s_1(k), \ldots, s_N(k)$ available to the normalizing gain estimator block 90.

Referring to FIG. 5, the estimation unit 95 i makes available the $N_a$ equalizer feed forward weight vectors $w_{1f}^i, w_{2f}^i, w_{N_a f}^i$ for i=1, 2, ..., $N_c$ to the collator 555. The collator 555 collates the N equalizer feed forward weight vectors and provides the collated equalizer feed forward weight vectors 535 a through N $w_{1f}(k), \ldots, w_{Nf}(k)$ to the normalizing gain estimator block 90. FIG. 2 shows the block diagram of the normalizing gain estimator that provides the N parameter $\alpha$ estimates $\alpha_1, \ldots, \alpha_N$ to the DSP unit 60.

Referring to FIG. 5, the collated filtered signals 540a though N $s_1(k), \ldots, s_N(k)$ are made available to the DSP unit. On the basis of the N filtered signals $s_1(k), \ldots, s_N(k)$, the DSP unit makes a joint estimate of the data symbol $\hat{a}(k)$. Referring to FIG. 5, the joint estimate of the data symbol $\hat{a}(k)$ is fed back to the bank of the estimation units 95 for providing the error signals for the update of the N adaptive algorithms.

Referring to FIG. 5, the joint estimate of the data symbol 565 $\hat{a}(k)$ is inputted to the feedback shift register 70 of length $K_2$ for some integer $K_2$. The feedback shift register makes available the $K_2$ delayed versions 75 $\hat{a}(k-1), \ldots, \hat{a}(k-K_2)$ of the joint estimate of the data symbol 565 $\hat{a}(k)$ to the scalar to vector converter 76. The scalar to vector converter 76 provides the equalizer feedback state vector $x_b(k)=[\hat{a}(k-1)\hat{a}(k-2) \ldots \hat{a}(k-K_2)]^T$ to the bank of the estimation units 95 for cancelling the inter symbol interference due to the past $K_2$ symbols. In various alternative embodiments of the invention, none of the N equalizer adaptive algorithms may be of the decision feedback type and thus $K_2$ is zero.

In various embodiments of the invention, the number and type of the adaptive algorithms in the various estimation units 95 may be different or use the same algorithm type but with different algorithm parameters such as the initial values of the equalizer weight vectors. In one example of the various embodiments, the number of diversity channels $N_c$ may be 3 with $N_a$ equal to 1 for all three estimation units 95. The three estimation units in the example case may use the Goddard's algorithm, the Sato's algorithm and the RLS algorithm respectively.

Various modifications and other embodiments of the invention applicable to various problems in Engineering and other fields will be readily apparent to those skilled in the art in the field of invention. The multiple algorithm architectures of the invention can be readily modified and applied to various fields where such an architecture is applicable. Examples of such fields in addition to various communication systems include Radars, sonar, digital audio systems, seismology, astronomy, and so on.

It is to be understood that the figures and descriptions of the present invention have been simplified to illustrate elements that are relevant for a clear understanding of the present invention, while eliminating other elements, for purposes of clarity. Those of ordinary skill in the art will recognize that these and other elements may be desirable. However, because such elements are well known in the art and because they do not facilitate a better understanding of the present invention, a discussion of such elements is not provided herein.

In general, it will be apparent to one of ordinary skill in the art that at least some of the embodiments described herein, including, for example, all of the modules of FIG. 1, may be implemented in many different embodiments of software, firmware, and/or hardware, for example, based on Field Programmable Gate Array (FPGA) chips or implemented in Application Specific Integrated Circuits (ASICS). The software and firmware code may be executed by a computer or computing device comprising a processor (e.g., a DSP or any other similar processing circuit) including, for example, the computing device 600 described below. The processor may be in communication with memory or another computer readable medium comprising the software code. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. According to various embodiments, the software may be firmware stored at an EEPROM and/or other non-volatile memory associated a DSP or other similar processing circuit. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Figure 6:
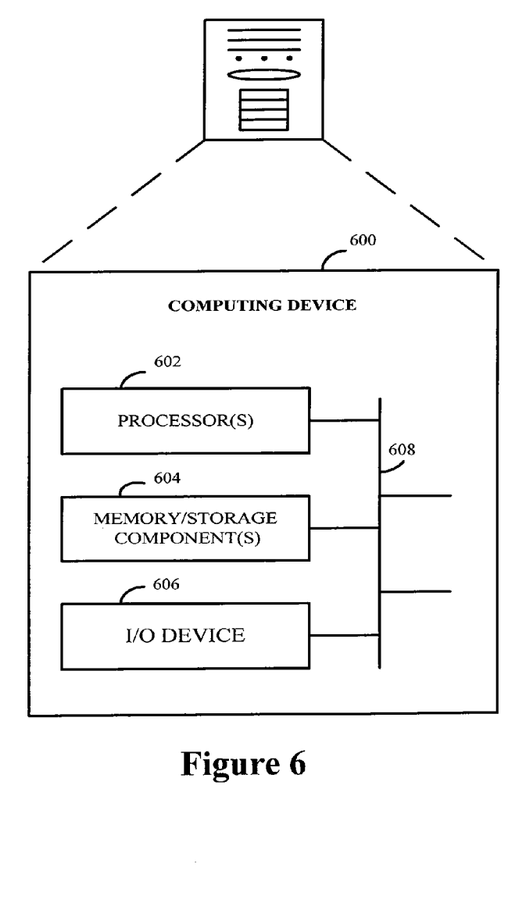
FIG. 6 shows one embodiment of an example computer device.

FIG. 6 shows an example of a computing device 600 according to one embodiment. For the sake of clarity, the computing device 600 is illustrated and described here in the context of a single computing device. However, it is to be appreciated and understood that any number of suitably configured computing devices can be used to implement a described embodiment. For example, in at least some implementations, multiple communicatively linked computing devices may be used. One or more of these devices can be communicatively linked in any suitable way such as via one or more networks. One or more networks can include, without limitation: the Internet, one or more local area networks (LANs), one or more wide area networks (WANs) or any combination thereof.

In the example of FIG. 6, the computing device 600 comprises one or more processor circuits or processing units 602, one or more memory circuits and/or storage circuit component(s) 604 and one or more input/output (I/O) circuit devices 606. Additionally, the computing device 600 comprises a bus 608 that allows the various circuit components and devices to communicate with one another. The bus 608 represents one or more of any of several types of bus structures, including a memory bus or memory controller, a peripheral bus, an accelerated graphics port, and a processor or local bus using any of a variety of bus architectures. The bus 608 may comprise wired and/or wireless buses.

The processing unit 602 may be responsible for executing various software programs such as system programs, applications programs, and/or program modules/blocks to provide computing and processing operations for the computing device 600. The processing unit 602 may be responsible for performing various voice and data communications operations for the computing device 600 such as transmitting and receiving voice and data information over one or more wired or wireless communications channels. Although the processing unit 602 of the computing device 600 is shown in the context of a single processor architecture, it may be appreciated that the computing device 600 may use any suitable processor architecture and/or any suitable number of processors in accordance with the described embodiments. In one embodiment, the processing unit 602 may be implemented using a single integrated processor.

The processing unit 602 may be implemented as a host central processing unit (CPU) using any suitable processor circuit or logic device (circuit), such as a as a general purpose processor. The processing unit 602 also may be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the processing unit 602 may be coupled to the memory and/or storage component(s) 604 through the bus 608. The bus 608 may comprise any suitable interface and/or bus architecture for allowing the processing unit 602 to access the memory and/or storage component(s) 604. Although the memory and/or storage component(s) 604 may be shown as being separate from the processing unit 602 for purposes of illustration, it is worthy to note that in various embodiments some portion or the entire memory and/or storage component(s) 604 may be included on the same integrated circuit as the processing unit 602. Alternatively, some portion or the entire memory and/or storage component(s) 604 may be disposed on an integrated circuit or other medium (e.g., hard disk drive) external to the integrated circuit of the processing unit 602. In various embodiments, the computing device 600 may comprise an expansion slot to support a multimedia and/or memory card, for example.

The memory and/or storage component(s) 604 represent one or more computer-readable media. The memory and/or storage component(s) 604 may be implemented using any computer-readable media capable of storing data such as volatile or non-volatile memory, removable or non-removable memory, erasable or non-erasable memory, writeable or re-writeable memory, and so forth. The memory and/or storage component(s) 604 may comprise volatile media (e.g., random access memory (RAM)) and/or nonvolatile media (e.g., read only memory (ROM), Flash memory, optical disks, magnetic disks and the like). The memory and/or storage component(s) 604 may comprise fixed media (e.g., RAM, ROM, a fixed hard drive, etc.) as well as removable media (e.g., a Flash memory drive, a removable hard drive, an optical disk). Examples of computer-readable storage media may include, without limitation, RAM, dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The one or more I/O devices 606 allow a user to enter commands and information to the computing device 600, and also allow information to be presented to the user and/or other components or devices. Examples of input devices include data ports, analog to digital converters (ADCs), digital to analog converters (DACs), a keyboard, a cursor control device (e.g., a mouse), a microphone, a scanner and the like. Examples of output devices include data ports, ADC's, DAC's, a display device (e.g., a monitor or projector, speakers, a printer, a network card). The computing device 600 may comprise an alphanumeric keypad coupled to the processing unit 602. The keypad may comprise, for example, a QWERTY key layout and an integrated number dial pad. The computing device 600 may comprise a display coupled to the processing unit 602. The display may comprise any suitable visual interface for displaying content to a user of the computing device 600. In one embodiment, for example, the display may be implemented by a liquid crystal display (LCD) such as a touch-sensitive color (e.g., 76-bit color) thin-film transistor (TFT) LCD screen. The touch-sensitive LCD may be used with a stylus and/or a handwriting recognizer program.

The processing unit 602 may be arranged to provide processing or computing resources to the computing device 600. For example, the processing unit 602 may be responsible for executing various software programs including system programs such as operating system (OS) and application programs. System programs generally may assist in the running of the computing device 600 and may be directly responsible for controlling, integrating, and managing the individual hardware components of the computer system. The OS may be implemented, for example, as a Microsoft® Windows OS, Symbian OS™, Embedix OS, Linux OS, Binary Run-time Environment for Wireless (BREW) OS, JavaOS, or other suitable OS in accordance with the described embodiments. The computing device 600 may comprise other system programs such as device drivers, programming tools, utility programs, software libraries, application programming interfaces (APIs), and so forth.

In various embodiments disclosed herein, a single component may be replaced by multiple components and multiple components may be replaced by a single component to perform a given function or functions. Except where such substitution would not be operative, such substitution is within the intended scope of the embodiments.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not include, but are not limited to, signals that a computer system or machine hosting or running a computer program can be configured to access, including signals downloaded through the Internet or other networks. For example, the distribution of software may be an Internet download.

I claim:

1. A blind mode multiple algorithms equalizer system (BMMAES) to recover the in general complex valued data symbols from a signal transmitted over a time-varying dispersive diversity wireless channel with an order of diversity $N_c$, the system comprised of:

a bank of $N_c$ estimations units wherein the estimation unit is comprised of a feed forward shift register for providing a feed forward state vector to a first multiplicity $N_a$ inner product operators; a multiplicity $N_a$ distinct adaptive algorithms with $N_a$ in the range of 1 and an integer $N_{a,max}$ for providing the $N_a$ equalizer forward weight vectors to the first multiplicity $N_a$ inner product operators for providing the $N_a$ feed forward signals comprising the first components of the $N_a$ filtered estimates of the data symbols wherein the type and the multiplicity $N_a$ of the adaptive algorithms may be different in the $N_c$ estimation units;

a collator for collating the filtered estimates of the data symbols from the aggregate number N of the adaptive algorithms providing the collated N filtered estimates of the data symbols wherein N is in the range of $N_c$ and the product $N_c N_{a,max}$; and a DSP unit for providing the jointly detected data symbol based on the collated N filtered estimates of the data symbols.

2. The system of claim 1, wherein the blind mode multiple algorithms equalizer system further comprises a feedback shift register for providing a feedback state vector to a second multiplicity $N_a$ inner product operators of the estimation unit for providing the $N_a$ feedback signals comprising second components of the $N_a$ filtered estimates of the data symbols.

3. The system of claim 1 wherein a multiplicity $N_a$ adaptive algorithms are for further providing the $N_a$ equalizer feedback weight vectors to the second multiplicity $N_a$ inner product operators of the estimation unit.

4. The system of claim 2 wherein the second components of the Na filtered estimates of the data symbols are set equal to 0.

5. The system of claim 1 wherein the blind mode multiple algorithms equalizer system further comprised of a normalizing gain estimator for providing the multiplicity N parameter α estimates to the DSP unit for normalizing the signal power in the collated N filtered estimates of the data symbols.

6. The system of claim 1 wherein the DSP unit is further comprised of: phase alignment subsystems 1 through N for providing gain normalization and phase alignment of the collated N filtered signals; a reference phase generator for generating the reference phase; a means of further adjusting the phase of the filtered signals; a combiner weights generator; a weighted combiner for weighted combining of the phase adjusted signals; a decision device for providing the jointly detected data symbol.

7. The system of claim 6 wherein phase alignment subsystem i for i equal to 1 through N is further comprised of: a gain normalizer; a phase accumulator unit; a decision device for providing the $i^{th}$ detected data symbol; a phase threshold device for providing the detected phase $\phi_i$; a means for estimating the signal to residual inter symbol interference (ISI) plus noise power ratio Γ.

8. The system of claim 1 wherein complex valued data symbols are the modulated signals modulated according to at least one method selected from the group consisting of the M-quadrature amplitude modulation (MQAM), M-phase shift keying (MPSK), and M-pulse amplitude modulation (MPAM) modulated signals, wherein the order of modulation M is the number of points in the signal constellation.

9. The system of claim 7 wherein the detected phase $\phi_i$ corresponds to the sector of the rotational symmetry of the signal constellation of the data symbols containing the $i^{th}$ gain normalized and phase aligned filtered signal.

10. The system of claim 6 wherein the combiner weights are based on the N signal to residual inter symbol interference (ISI) plus noise power ratios according to the maximal ratio diversity combining technique.

11. The system of claim 6 wherein the reference phase generator is for further partitioning the phase adjusted filtered signals 1 through N according to the corresponding detected N phase $\phi_1$ through $\phi_N$ and for providing the set $S_p$ containing the maximum number of the phase adjusted filtered signals.

12. The system of claim 6 wherein the combiner weights for the signals in the set $S_p$ are based on the signal to ISI plus noise power ratios for the set of signals $S_p$ with the combiner weights for the signals not belonging to the set $S_p$ set equal to 0.

13. The system of claim 6 wherein the combiner weights are determined according to Sato's algorithm.

14. The system of claim 6 wherein the combiner weight for the signal in the set $S_p$ with the maximum signal to ISI plus noise power ratio is set equal to 1 with all other weights set equal to 0.

15. The system of claim 1 wherein both $N_c$ and the aggregate number N of the adaptive algorithms are equal to 3 and wherein the N adaptive algorithms are all distinct.

16. The system of claim 1 wherein the distinct adaptive algorithms are selected from the group consisting of the recursive least squares (RLS) algorithm, quantized state algorithm (QS), LMS algorithm, Sato's algorithm, and the constant modulus (CMA) algorithm.

17. A computer-implemented method for recovering the complex valued data symbols from the signals transmitted over time-varying dispersive diversity wireless channel with order of diversity $N_c$, the method comprising:

receiving, by a computer device, the channel output signal, wherein the computer device comprises at least one memory and associated memory device;

implementing, by the computer device, a bank of $N_c$ estimations units wherein the estimation unit is comprised of a feed forward shift register for providing a feed forward state vector to a first multiplicity $N_a$ inner product operators; a multiplicity $N_a$ distinct adaptive algorithms with $N_a$ in the range of 1 and an integer $N_{a,max}$ for providing the $N_a$ equalizer forward weight vectors to the first multiplicity $N_a$ inner product operators for providing the $N_a$ feed forward signals comprising the first components of the $N_a$ filtered estimates of the data symbols wherein the type and the multiplicity $N_a$ of the adaptive algorithms are different in the $N_a$ estimation units;

implementing, by the computer device, a collator for collating the filtered estimates of the data symbols from the aggregate number N of the adaptive algorithms providing the collated N filtered estimates of the data symbols wherein N is in the range of $N_c$ and the product $N_c N_{a,max}$; and implementing, by the computer device, a DSP unit for providing the jointly detected data symbol based on the collated N filtered estimates of the data symbols.

18. The method of claim 17, wherein the method is further comprised of implementing, by the computer device, a feedback shift register for providing a feedback state vector to a second multiplicity $N_a$ inner product operators of the estimation unit for providing the $N_a$ feedback signals comprising the second components of the $N_a$ filtered estimates of the data symbols.

19. The method of claim 17 wherein a multiplicity $N_a$ possibly distinct adaptive algorithms are for further providing the $N_a$ equalizer feedback weight vectors to the second multiplicity $N_a$ inner product operators of the estimation unit.

20. The method of claim 18 wherein the second components of the $N_a$ filtered estimates of the data symbols are set equal to 0.

21. The method of claim 17 wherein the DSP unit is further comprised of: phase alignment subsystems 1 through N for providing gain normalization and phase alignment of the collated N filtered signals; a reference phase generator for generating the reference phase; a means of further adjusting the phase of the filtered signals; a combiner weights generator; a weighted combiner for weighted combining of the phase adjusted signals; a decision device for providing the jointly detected data symbol.

22. The method of claim 21 wherein phase alignment subsystem i for i equal to 1 through N is further comprised of: a gain normalizer; a phase accumulator unit; a decision device for providing the $i^{th}$ detected data symbol; a phase threshold device for providing the detected phase $\phi_i$; a means for estimating the signal to residual inter symbol interference (ISI) plus noise power ratio $\Gamma_i$; and the combiner weights are based on the signal to residual ISI plus noise power ratios.

* * * * *